No. 631,798. Patented Aug. 29, 1899.
J. B. LEARNED.
CALF FEEDER.
(Application filed Mar. 29, 1899.)
(No Model.)
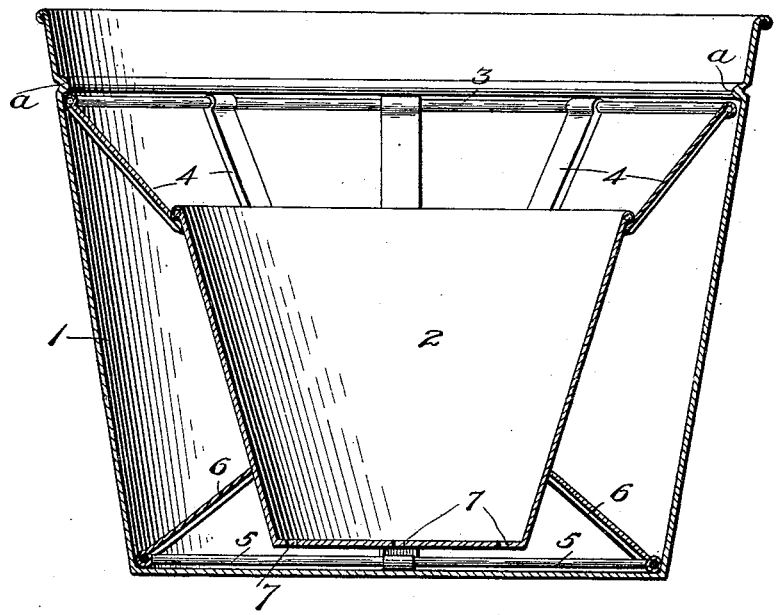
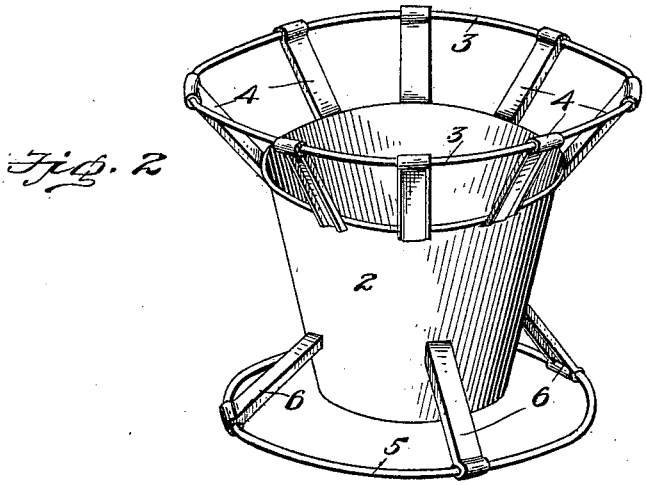
Inventor
J. B. Learned
Witnesses
by H. B. Willson & Co.
Attorneys

UNITED STATES PATENT OFFICE.

JOHN B. LEARNED, OF NORTHAMPTON, MASSACHUSETTS.

CALF-FEEDER.

SPECIFICATION forming part of Letters Patent No. 631,798, dated August 29, 1899.

Application filed March 29, 1899. Serial No. 710,899. (No model.)

*To all whom it may concern:*

Be it known that I, JOHN B. LEARNED, a citizen of the United States, residing at Northampton, in the county of Hampshire and State of Massachusetts, have invented certain new and useful Improvements in Calf-Feeders; and I do declare the following to be a full, clear, and exact description of the invention, such as will enable others skilled in the art to which it appertains to make and use the same.

My invention relates to calf-feeders; and the object is to provide a simple, inexpensive, and effective device whereby the young animal is taught to drink from a bucket in which the milk is fed in such limited quantities as to prevent the calf from drinking too rapidly.

To this end the invention consists in the construction, combination, and arrangement of the several parts of the device, as will be hereinafter fully described and particularly pointed out in the claims.

In the accompanying drawings the same reference characters indicate the same parts of the invention.

Figure 1 is a vertical section of my improved calf-feeder. Fig. 2 is a perspective view of the feeder removed from the pail.

1 denotes the milk-pail, and 2 the conical feeder, supported concentrically within the pail by means of the annular guard 3, from which the guard-bars 4 4 extend to the pail.

5 denotes an annular bracket surrounding the lower end of the feeder, to which it is connected by the radiating braces 6 6.

7 7 denote small orifices in the bottom of the feeder through which the milk flows from the milk-pail. These orifices are of such a size and number as to permit the milk to flow into the feeder in about the same quantity as the calf would obtain from the mother.

The guard-bars 4 4 in addition to bracing the feed in the pail and thereby preventing its accidental displacement also serve as barriers to prevent the calf having access to the milk in the pail, and thus compelling it to use the milk which finds its way into the feeder through the orifices in the bottom.

I have shown the pail 1 formed with an annular bead *a*, under which the annular guard 3 may be sprung to retain the feeder in place in the pail when in use.

It will of course be understood that various changes in the form, proportion, and the minor details of construction may be resorted to without departing from the spirit or sacrificing any of the advantages of this invention.

Having thus fully described my invention, what I claim, and desire to secure by Letters Patent, is—

1. A calf-feeder comprising the pail 1 formed with the plane imperforate bottom and the continuous inwardly-projecting bead *a*; in combination with the vessel 2 formed with an imperforate wall and a plane perforate bottom arranged parallel with the plane imperforate bottom, of the pail 1, the annular guard-rail 3 and the diverging guard-bars 4 4 connecting the wall of the vessel 2 and said guard-rail 3, the annular bracket 5 and the diagonal radiating braces 6 6 connecting the bracket and vessel in such manner as to support the vessel in the pail with its perforate bottom slightly above and parallel with the bottom of the pail, substantially as shown and described.

2. The vessel 2 formed with an imperforate wall and a plane perforate bottom, the annular guard-rail 3, and the diverging guard-bars 4 connecting the wall of said vessel and said guard-rail 3, the annular bracket 5, and the diagonal radiating braces 6 6 connecting the vessel and bracket in such manner as to support the perforate bottom of said vessel slightly above and parallel with said bracket 5, substantially as and for the purpose set forth.

In testimony whereof I have hereunto set my hand in presence of two subscribing witnesses.

JOHN B. LEARNED.

Witnesses:
SAML. A. DRURY,
E. V. CAVERLY.